United States Patent Office 3,705,872
Patented Dec. 12, 1972

3,705,872
PROCESS FOR THE PRODUCTION OF BONDED PARTICLES AS A MATERIAL OF CONSTRUCTION
Clifford V. Wittenwyler, Union, N.J., assignor to Shell Oil Company, New York, N.Y.
No Drawing. Continuation-in-part of application Ser. No. 792,163, Jan. 17, 1969. This application Apr. 5, 1971, Ser. No. 131,460
Int. Cl. C08g 51/04
U.S. Cl. 260—37 EP
8 Claims

ABSTRACT OF THE DISCLOSURE

Foundry cores are prepared by (1) mixing from about 90 to 99 parts by weight of foundry sand with from 1 to 10 parts by weight of a polyepoxide binder, (2) mixing said blend with a curing amount of a boron trihalide complex, especially boron trifluoride dihydrate, in an oxygenated hydrocarbon, (3) packing the blend into suitable forms and (4) allowing the polyepoxide to cure with or without heating.

---

This is a continuation-in-part of U.S. Ser. No. 792,163, filed Jan. 17, 1969, now abandoned.

BACKGROUND OF THE INVENTION

Field of the invention

This invention involves a process for the preparation of a rapid-cure foundry core which is curable at ambient temperatures.

Prior art

In the foundry industry, foundry cores are used in helping to shape that part of a casting not readily shaped by the mold proper. With today's high production rates, modern foundry practice requires rapid core production and sometimes requires that foundry cores be made on a one to five minute cycle without heat curing. Not only do metal foundries require a fast curing core, but the core also should be low cost and of light weight refractory material as well.

Presently various resins, such as the B-staged phenol-formaldehydes and urea-formaldehydes, are used to bond sand into such required shapes, but they require rather extensive heating of the core box to effect the required cure (Introduction to Foundry Technology, Ekey, D.C. and Winter, W.P., McGraw-Hill Book Company, Inc., New York, N.Y., 1958). Although these resins result in adequate cores, the heating often results in a short life for the core box, dimensional changes in the core as it cools, non-uniform curing due to poor heat transfer, especially in large pieces, and inefficient use of the core box because of the long cure time.

Various attempts have been made to eliminate or reduce these shortcomings including the utilization of epoxy resins as binder agents. Epoxy resins, however, are relatively more expensive than the conventional phenol-formaldehyde, urea-formaldehyde and furan resins, and this tends to limit the use of epoxy resins except for special applications. A particularly good process which reduces the shortcomings exhibited by the conventional resins such as long curing times, employs a heated, epoxy-wetted sand mixture which is packed in the form and the mass cured rapidly by filling the permeable voids with a gaseous curing agent such as ammonia. While this process did eliminate many of the shortcomings, special machinery was required including pressure sealing means, and some permeation difficulties are encountered when special intricate shapes are involved.

Another system described in U.S. 3,107,403 which attempted to overcome the lengthy curing time and effect a fast cure involved the use of epoxy resins and $BF_3$ gas. However, in the use of $BF_3$ many precautions have to be taken to protect against the extreme corrosiveness of the gas. And, since $BF_3$ has such a great affinity for water the cores require nearly 0% relative humidity to be effective. This difficulty is no less troublesome than an oven bake, required for the heat curable resins. Further, the gas is known to be highly toxic and additional equipment would probably be required to absorb the excess gas and avoid air pollution. In addition to these shortcomings, in using $BF_3$ gas, as in the use of ammonia, one encounters permeation difficulties when special intricate shapes are used and thus portions of the cores do not cure sufficiently.

A method described in U.S. 3,268,466, presents cold-hardening foundry core compositions comprising sand, epoxy resins, a compound with an amine group (n-aminoethylpiperazine), and furfuryl alcohol. These compositions, however, still require a substantial amount of time to cure at room temperature, e.g., at least 1½ to about 24 hours and if more rapid cures are to be effected the core must be heat cured.

Another system for preparing foundry cores employs a drying oil and an isocyanate resin which are mixed separately with two sand streams. Simply, the mixing process employs a mixing machine which utilizes two parallel ribbon blenders for mixing the blender which mixes the two sand streams and permits the oil and isocyanate resin to react. This stream is then emptied into the core blower. The cores then require 4 to 5 minutes to strip at ambient temperature but require from 4 to 16 hours additional time to develop full useable strength. An alternate system utilizes furfuryl alcohol cured with a phosphoric acid catalyst. This too requires 10 minutes or more to cure in the mold bond and one to 12 hours aging before it can be used. It also has an objectionable odor during mold heating and metal pouring.

It can be seen that much work has been done to find a foundry core which develops its full usable strength within a short period of time. But, it will be appreciated that all currently used processes for manufacturing foundry cores or molds suffer from one or more serious shortcoming, such as (1) special machinery required, (2) high material cost, (3) slow cure rate, (4) high toxicity, (5) high corrosion rate, (6) high temperature cures (7) long post cures and (8) poor handling qualities.

An improved process has now been found for preparing foundry cores which has all the attractive features which are absent in the above-noted processes including: (1) adaptable to currently used foundry equipment; (2) low to moderate material cost; (3) extremely fast cure without loss of control; (4) low toxicity; (5) low corrosion rate; (6) ambient temperature cure; (7) no post cure; and (8) excellent handling qualities.

SUMMARY OF THE INVENTION

This invention provides a new method for consolidating inert particles by mixing from about 80 to 99 parts by weight of inert particles such as sand, aluminum silicate, zirconium oxide, metal particles, glass fibers, etc. with from 1 to 20 parts by weight of a polyepoxide binder, mixing the blend with from 0.5 to 40.0 parts per 100 parts of polyepoxide of boron trihalide complexes, especially boron trifluoride complexes, in an oxygenated hydrocarbon, packing and forming the mix and allowing the mix to cure at ambient temperatures. The process of the invention can also be carried out by simultaneously mixing the inert particles with the polyepoxide binder and the boron trifluoride complex mixture.

More particularly, the invention provides a method for consolidating sand for foundry core materials. The instant method is also suitable for manufacturing porous, low-cost, light weight products such as filter media, building bricks, diffusion plates, syntactic foams for light weight, high strength requirements and vacuum forming molds.

Other uses for such composite sand-resin materials are as filter media for oil and gasoline in combustion engines and elsewhere, decorative building bricks, diffusion panels, syntactic foams for light weight, high-strength requirements. Also, strong, chemically resistant panels can be made when random fibers are bonded in the above manner.

Porous dies made with this material for forming thermoplastic sheet apply vacuum uniformly for good reproduction. Air can be applied to remove the part and cool the die. Dies for pressure moldings can be heated and/or cooled during the molding cycle by passing fluids through the die. Fine metal particles may be substituted for the sand to improve maleability and heat dissipation.

Cured epoxy resins currently are very expensive and some cost in excess of $40.00 per cubic foot. By using a low cost filler such as silica flour, the cost can be reduced by about one-half. The present process produces a composite which reduces the cost to less than 10% of the cost of previous filled epoxy compositions, while still retaining most of the outstanding chemical resistance and mechanical strength characteristic of the epoxy resins.

It will be appreciated that the present process eliminates or significantly reduces the shortcomings of the prior art methods. For example, a unique feature of the present process circumvents the obvious difficulty of mixing quickly and completely (a) a fast curing resin-catalyst combination and then (b) mixing the blend uniformly with sand at a 1 to 50 ratio before curing begins to occur.

Simply, these advantages are achieved by first dispersing the resin binder in the sand by conventional mixing techniques. This resin-sand blend is then stable and may be stored indefinitely. Before use, the curing combination of special boron trifluoride complexes with an oxygenated hydrocarbon is then added to the resin-sand blend, and the resulting mix packed into a suitable mold and allowed to cure. Or the resin binder and curing agent can be despensed side by side into a continuous sand mixer.

DESCRIPTION OF THE PREFERRED EMBODIMENTS

As noted hereinbefore, the present invention provides an improved process for consolidating sand to manufacture foundry cores. The present method can be effectively employed to produce many bonded materials of construction such as porous filters, porous dies and structural members; however, the following disclosure will be directed more particularly to the production of foundry cores. It is understood that such description does not limit the invention.

In general, the actual techniques involved in foundry core preparation form no part of the present invention and any conventional technique for forming such sand cores may be employed.

In one embodiment, the sand and the polyepoxide resin are mixed thoroughly. This blend is stable since no curing agent is present and may be stored indefinitely. Before use, the curing agent is added to the resin-sand blend so that the ratio of boron trihalide complex to polyepoxide is about 0.5 to about 40.0, and preferably 1.0 to 20.0 parts, per 100 parts by weight of the polyepoxide. The resulting blend is then packed into a suitable mold and the mass allowed to cure. It is believed that the vigorous exotherm from the reaction is contained by the heat capacity of the sand. The second mixing step is readily achieved in thirty seconds using conventional mixing equipment and the resulting sand core system then cures in about two to five minutes at ambient temperatures to provide a useable core.

Alternatively both the polyepoxide binder and the boron trihalide complex can be added to the sand simultaneously in a continuous sand mixer. Again, since there is a great excess of sand, it acts as a heat sink and the heat from the reaction is contained.

The inert particles

In the usual practice of the invention, said or other suitable foundry core-forming inert compositions will be used as the filler, but other inert particles may be utilized in the practice of the present process. In general, the inert particles should be finely divided and have a mesh size varying from about 4 to 300, and preferably should be a homogeneous mixture of particles from AFS30 to AFS90. Suitable inert materials include, among others, sand, crushed rocks, metal powders, chips, ground walnut shells, spheres, crushed quartz, aluminum oxide, hollow glass or plastic spheres or glass fibers and finely divided resinous particles. Mixtures of various types of particles may also be used. Preferred are the minerals, especially the siliceous materials such as, for example, sand and ground rock. Especially preferred is silica sand.

It has been found that washed silica, zircon, chromite and aluminum silicate give excellent response. Best results have been obtained using relatively dry sand; that is, the moisture content is less than 0.5 percent by weight (% w.) and preferably will be less than the percentage at which the curing agent is present. That is, if the binder is present at 1% w. of sand the the curing agent is present at a level of 0.2% w. of sand, total moisture should not exceed 0.2% w. of sand.

In general, the sand-polyepoxide blend comprises from about 80 to 99 parts by weight of inert material (sand) and, from about 1 to 20 parts by weight of polyepoxide binder. For most foundry core applications, however, the blend comprises from about 95 to 99 parts by weight of sand and from about 1 to 5 parts by weight of polyepoxide.

In general, the sand and the polyepoxide binder are blended at ambient temperatures of from about 75° F. to 120° F., and at atmospheric presure.

The polyepoxide binders

The resin binders which are suitable for the present process include the polyepoxides. The materials are compounds possessing more than one vicinal epoxy group, i.e., more than one

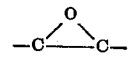

group. These compounds may be saturated or unsaturated, aliphatic, cycloaliphatic, aromatic or heterocyclic and may be substituted with substituents, such as chlorine, hydroxyl groups, alkoxy groups and the like. They may be monomeric or polymeric. It is understood that these polyepoxide binders may be a blend of various polyepoxides or a polyepoxide with a monoepoxide.

For clarity many of the polyepoxides and particularly those of the polymeric type are described in terms of epoxy equivalent values or "epoxy equivalency." The meaning of this expression is described in U.S. 2,633,458. The polyepoxides used in the present process are those having an epoxy equivalency greater than 1.0.

Various examples of polyepoxides that may be used in the process of the invention are given in U.S. 2,633,458 and it is to be understood that so much of the disclosure of that patent relative to examples of polyepoxides is incorporated by reference into this specification.

Other examples include the epoxidized esters of the polyethylenically unsaturated monocarboxylic acids, such as epoxidized linseed, soybean, perilla, oiticia, tung, walnut and dehydrated castor oil, methyl linoleate, butyl linoleate, ethyl 9,12-octadecadienoate, butyl 9,12-octadecadienoate, butyl 9,12,15-octadecatrienoate, butyl eleostearate, monoglycerides of tung oil fatty acids, monoglycerides of soybean oil, sunflower, rapeseed, hempseed, sardine, cottonseed oil, and the like.

Another group of the epoxy-containing materials used in the process of the invention include the epoxidized esters of unsaturated monohydric alcohols and polycarboxylic acids, such as, for example di(2,3-epoxybutyl) adipate, di(2,3-epoxybutyl oxalate, di(2,3-epoxyhexyl) succinate, di(3,4-epoxybutyl) maleate, di(2,3-epoxyoctyl) pimalate, di(2,3-epoxybutyl) phthalate, di(2,3-epoxyoctyl) tetrahydrophthalate, di(4,5-epoxydodecyl) maleate, di(2,3-epoxybutyl) terephthalate, di(2,3-epoxypentyl) thiodipropionate, di(5,6-epoxytetradecyl) diphenyldicarboxylate, di(3,4-epoxyheptyl) sulfonyldibutyrate, tri(2,3-epoxybutyl) 1,2,4-butanetricarboxylate, di(5,6-epoxypentadecyl) tartarate, di(4,5-epoxytetradecyl) maleate, di-di(2,3-epoxybutyl) azelate, di(3,4-epoxybutyl) citrate, di-(5,6-epoxyoctyl) cyclohexane-1,3-dicarboxylate, di(4,5-epoxyoctadecyl) malonate.

Another group of the epoxy-containing materials include those epoxidized esters of unsaturated alcohols and unsaturated carboxylic acids, such as 2,3-epoxybutyl 3,4-epoxypentanoate, 3,4-epoxypentanoate, 3,4-epoxycyclohexyl 3,4-epoxycyclohexanoate, 3,4-epoxycyclohexyl 4,5-epoxyoctanoate, 2,3-epoxycyclohexylmethyl epoxycyclohexane carboxylate.

Still another group of the epoxy-containing materials included epoxidized derivatives of polyethylenically unsaturated polycarboxylic acids such as, for example, dimethyl 8,9,12,13-diepoxyeiconsanedioate, dibutyl 7,8-11,12-diepoxyoctadecanedioate,
dioctyl 10,11-diethyl-8,9,12,13-diepoxyeicosanedioate,
dihexyl 6,7,10,11-diepoxyhexadecanedioate,
didecyl 9-epoxy-ethyl-10,11,epoxyoctadecanedioate,
dibutyl 3-butyl-3,4,5,6-diepoxycyclohexane-1,2-dicarboxylate,
dibenzyl 1,2,4,5-diepoxycyclohexane-1,2-dicarboxylate and
diethyl 5,6,10,11-diepoxyoctadecyl succinate.

Still another group comprises the epoxidized polyesters obtained by reacting an unsaturated polyhydric alcohol and/or unsaturated polycarboxylic acid or anhydride groups, such as, for example, the polyester obtained by reacting 8,9,12,13-eicosadienedioic acid with ethylene glycol, the polyester obtained by reacting diethylene glycol with 2-cyclohexane-1,4-dicarboxylic acid and the like, and mixtures thereof.

Still another group comprises the epoxidized polyethylenically unsaturated hydrocarbons, such as epoxidized 2,2-bis(2-cyclohexenyl) propane, epoxidized vinyl cyclohexane and epoxidized dimer of cyclopentadiene.

Another group comprises the epoxidized polymers and copolymers of diolefins, such as butadiene. Examples of this include, among others, butadiene-acrylonitrile copolymers (Hycar rubbers), butadiene-styrene copolymers and the like.

Other suitable polyepoxides include the 3,4-epoxycyclohexylmethyl 3,4-epoxycyclohexane carboxylates which are, in general, free of any functional groups other than epoxy. Preferably such diepoxides may be represented by the structural formula:

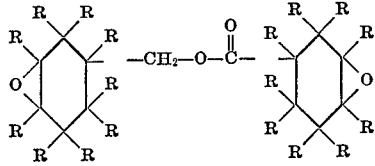

wherein R is a hydrogen or lower alkyl group, preferably from 1 to 5 carbon atoms. These diepoxides may be easily prepared by the action of peracetic acid and unsaturated cycloaliphatic ester such as 3-cyclohexenylmethyl 3-cyclohexenecarboxylate. These unsaturated cycloaliphatic esters are also readily prepared by subjecting selected cyclic unsaturated aldehydes to the Tischenko reaction in the presence of an aluminum alkoxide catalyst. The 3,4-epoxycyclohexylmethyl 3,4 - epoxycyclohexanecarboxylates obtainable by this procedure include 3,4-epoxycyclohexylmethyl 3,4-epoxycyclohexanecarboxylate and the alkyl-substituted, and preferably the lower alkyl-substituted homologues thereof such as for example, 3,4-epoxy-1-methylcyclohexylmethyl 3,4-epoxy-1-methylcyclo hexanecarboxylate,
3,4-epoxy-2 or 5-methylcyclohexylmethyl 3,4-epoxy-2 or 5-methylcyclohexanecarboxylate,
3,4-epoxy-3-methylcyclohexylmethylcyclohexanecarboxylate,
3,4-epoxy-4-methylcyclohexylmethyl 3,4-epoxy-4-methylcyclohexanecarboxylate, and
3,4-epoxy-6-methylcyclohexylmethyl 3,4-epoxy-6-methylcyclohexanecarboxylate.

The polyepoxides that are particularly preferred for use in the compositions of the invention are the normally liquid glycidyl ethers and particularly the glycidyl ethers of polyhydric phenols and polyhydric alcohols. The glycidyl ethers of polyhydric phenols are obtained by reacting epichlorohydrin with the desired polyhydric phenols in the presence of alkali. Polyether A and Polyether B described in above noted U.S. 2,633,458 are good examples of polyepoxides of this type. These are both glycidyl polyethers of 2,2 - bis(4-hydroxyphenyl)propane(bisphenol A). Especially useful is the polyether which exhibits an average molecular weight of about 340-380 and an epoxide equivalent weight of about 185-192.

Other preferred polyepoxides include the condensation products of epichlorohydrin and aliphatic polyols such as glycerol. A preferred polyepoxide of this type is a mixture of branched di- and tri-epoxides made by the condensation of epichlorohydrin and glycerol and having an epoxide equivalent weight of from about 140-160 and an average molecular weight of from about 300 to 350.

Because of high viscosities of some of the epoxy binders it is often advantageous to employ diluents or viscosity reducers to improve the ease of handling. Reactive diluents suitable for this purpose include phenyl glycidyl ether, butyl glycidyl ether, styrene oxide, furfural, furfuryl alcohol, glycidyl esters of alpha-branched, saturated aliphatic, monocarboxylic acids, and others. Nonreactive diluents include ethyl naphthalene, coal tar, pine oil and xylene. Co-reactive diluents which appear to react with the polyepoxide under the influence of the $BF_3$ complex include ethylene and propylene glycols and their polymers.

In general, up to about 25% by weight of the polyepoxide may be replaced with one or more of the above-noted reactive or non-reactive diluents. Other additives may be added as desired such as surface tension depressants, wetting agents, solvents, adhesion promoters, mold release agents, etc.

Especially preferred as a reactive diluent are the glycidyl esters of alpha-branched, saturated monocarboxylic acids, for not only are these compounds useful for reducing viscosity, but also enter into the reaction via their epoxy groups and therefore the reactivity is not significantly reduced. Further, the branched structure of these diluents tends to improve moisture stability of the binder.

Thus, it has been found that an especially preferred binder is a mixture of a glycidyl polyether of a polyhydric phenol with a glycidyl ester of an alpha-branched saturated monocarboxylic acid. Particularly effective in this regard is a mixture of a normally liquid glycidyl polyether of 2,2-bis(4-hydroxyphenyl)propane and a glycidyl ester of the formula

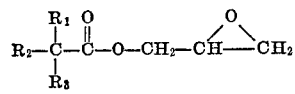

where $R_1$ and $R_2$ are alkyl radicals of 1–15 carbons, $R_3$ is a hydrogen or hydrocarbyl, which are useful in the preparation of these esters. Examples of the acids are pivalic acid, alpha, alpha-dimethyldecanoic acid, alpha, alpha-dimethylhexadecanoic acid and mixtures thereof. These tertiary acids (alpha-branched) may suitably be prepared by reaction of formic acid or carbon monoxide and water with olefins, in the presence of liquid acid catalysts, such as $H_2SO_4$, $H_3PO_4$, $BF_3$, HF and combinations of these and other catalysts known in this field of art. Suitable such alpha-branched, saturated monocarboxylic acids may be represented by the general formula

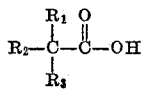

wherein $R_1$ and $R_2$ each represents the same or different alkyl radicals of normal, branched or cyclic structure and $R_3$ represents hydrogen or a hydrocarbyl radical. In the foregoing formula $R_1$ and $R_2$ each may be methyl, ethyl, propyl, butyl, pentyl, octyl, decyl, etc. radical. Hydrocarbyl radicals represented by $R_3$ comprise, for example, alkyl radicals of normal, branched or cyclic structure, including methyl, ethyl, propyl, butyl, pentyl, hexyl, octyl, as well as alkaryl, aralkyl and aryl radicals. Very suitable such monocarboxylic acids include the alpha, alpha-dialkyl monocarboxylic acids having from 9 to about 22 carbon atoms in the molecule. A preferred group comprises the acids possessing from about 9 to 19 carbon atoms with those acids having from 9 to 11 being especially preferred. Suitable methods for their preparation are disclosed in U.S. 3,047,662, U.S. 3,059,004, U.S. 3,059,005 and U.S. 3,059,006. The saturated monocarboxylic acids preferably have at least 8 carbon atoms per molecule.

The glycidyl esters of the above monocarboxylic acids may be prepared in any of the known ways for obtaining epoxy esters from monocarboxylic acids. A preferred method for preparing such esters is set forth in a U.S. Pat. No. 3,178,454, issued Apr. 13, 1965, of Nantko Kloos and Jacques J. J. Drost.

Preferred are the glycidyl esters of the general formula

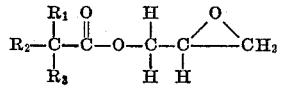

wherein $R_1$ and $R_2$ are each alkyl radicals such as methyl, ethyl, propyl, butyl, pentyl, nonyl, etc., and $R_3$ is hydrogen or an alkyl radical and $R_1$, $R_2$ and $R_3$ contain the sum total of from 2 to about 20 carbon atoms and preferably from about 7 to 17 carbon atoms.

A very preferred glycidyl ester is the glycidyl ester of a mixture of alpha-branched, saturated, aliphatic monocarboxylic acids containing 9 to 11 carbon atoms and prepared by the process described in Example I of U.S. 3,268,462, issued Aug. 23, 1966. A very suitable such glycidyl ester is available commercially under the trade name of Cardura® E Resin and which is the glycidyl ester of a mixture of saturated monocarboxylic acids having a chain length of 9–11 carbon atoms, and largely consisting of tertiary acids (about 94%). As used herein the term glycidyl ester includes the glycidyl ester of a single acid as well as esters of mixtures of acids.

It has been found that about 80–98 parts by weight of the polyepoxide mixed with 2–20 parts by weight of the glycidyl ester produces an effective binder. Particularly effective is a mixture of about 90–95 parts by weight of the polyepoxide with 5–10 parts by weight of the glycidyl ester.

The curing agents

Suitable curing agents comprise certain boron trihalide complexes i.e., $BX_3$ wherein X is a halogen such as the boron trifluoride etherates, phenolates, alcoholates and hydrates and the corresponding boron trichloride complexes. Especially preferred is boron trifluoride dihydrate.

Although boron trifluoride amine complexes are known as curing agents for polyepoxides (U.S. 2,824,083), it has been found that they are unsuitable for the purposes of this invention since they cure too slowly and require elevated temperatures to cause the polyepoxide binder to polymerize.

The $BF_3$ complexes may be prepared by conventional methods. The boron trifluoride etherates and hydrates are simply prepared by passing $BF_3$ gas into an ether such as diethyl ether, or water, respectively. It will be appreciated also, that the $BF_3$-phenolates are prepared by conventional techniques wherein $BF_3$ is reacted with phenol.

Although the boron trifluoride phenolate complex can be utilized as a curing agent, it is difficult to use because it is so fast acting and difficult to handle. In addition to this disadvantage, the $BF_3$ phenolate darkens on standing, thus showing a certain instability. This complex also exhibits the undesirable characteristic of forming a cloud of "smoke" when exposed to the air. Although the $BF_3$ etherates are even worse in this regard, the $BF_3$ dihydrate does not exhibit similar characteristics, and this is another reason why the latter complex is preferred.

A curing amount of curing agent is that amount necessary to properly cure the polyepoxide so that an adequate foundry core will be made. This usually amounts to from 0.5 to 40.0 parts of the boron trifluoride complex per 100 parts of polyepoxide binder. Particularly effective is from 1.0 to 20.0 parts of the $BF_3$ complex per 100 parts of polyepoxide binder.

The oxygenated hydrocarbons

It is preferable, and in some case necessary, particularly if the $BF_3$-catalyst is a solid, to employ one or more diluents such as an aliphatic polyol such as glycerol, ethylene glycol, hexanetriol, hexylene glycol, polypropylene glycol; ketones such as acetone, methylethyl ketone, methylisobutyl ketone, isophorone, etc.; esters such as ethyl acetate, butyl acetate, Cellosolve acetate (ethylene of ethylene glycol monoethyl ether monoacetate, methyl Cellosolve acetate (acetate of ethylene glycol monomethyl ether); chlorinated hydrocarbons such as trichloropropane, chloroforms, etc.; and diethyl phthalate and dibutyl phthalate; and ethers such as polypropylene glycol (MW 150, 425 or 1000) polyethylene glycol, dimethoxy ethane, and the diethyl ether of diethylene glycol. However, it has been found that certain of these diluents, such as hexylene glycol, although useful if used relatively soon after mixing, should not be used if the curing agent is to be stored in the diluent for an extended period of time since an unstable mixture is formed. Other diluents, such as the chlorinated hydrocarbons, exhibit certain disadvantages as well. Preferred are the oxygenated hydrocarbon diluents and the aliphatic polyols are particularly suitable.

Although not understood at the present time, it is believed that the polyols enter into the reaction and for this reason certain diluents are preferred. It has been found that polyakylene glycols such as polyethylene glycol and polypropylene glycol, especially the latter, are particularly preferred in the process of this invention. Low molecular weight polyalkylene glycol are desirable for the attainment of a manageable viscosity but have high hydroxyl contents and therefore give softer polymers. Higher molecular weight polyalkylene glycols, while giving hard polymers, form crystalline adducts of boron trifluoride dihydrate. So it has been found that a blend of a low molecular weight polyalkylene glycol with one of a higher molecular weight produces the best results. Thus a mixture of polypropylene glycol of molecular weight up to 250 and polypropylene glycol of molecular weight of 350–500 is particularly effective.

Generally the mixture can be about 25–75% of the lower molecular weight polypropylene glycol and the difference of the higher molecular weight polypropylene glycol. Most effective is a mixture of about 50% of each of a polypropylene glycol 150 and a polypropylene glycol 425.

In general, the diluent is employed in amounts to give a 5%–50% by weight solution of the boron trifluoride complex in the diluent.

The invention is illustrated by the following examples. The reactants, their proportions and other specific ingredients are presented as being typical and are not to be construed as limiting. Unless otherwise specified, parts and percentages disclosed are by weight.

EXAMPLE I

Two parts by weight of a liquid glycidyl polyether of 2,2-bis(4-hydroxyphenyl)propane having an average molecular weight of approximately 380 and an epoxide equivalent weight of about 185 (Polyether A) was first blended with 98 parts by weight of foundry sand and then this blend was mixed with 0.5 parts by weight of boron trifluoride dihydrate ($BF_3 \cdot 2H_2O$) as a 22% solution in hexylene glycol.

An automatic metering-mixing machine (Shalco-Fordath Mark III) was used to porduce 280 pounds of treated core sand per minute. The blended sand was made into foundry cores weighing up to 25 pounds each. Gray iron was poured using the cores. Excellent cores and resulting molds were obtained having the following advantages and characteristics:

(1) Good mixing
(2) Easy handling and packing into the molds
(3) Fast (four minute) cure without heat
(4) High strength, which eliminates rodding
(5) Low odor during preparation and pouring
(6) Low gassing during pouring
(7) Good burnout, sand easily removed
(8) Smooth finish on grey iron, which eliminates need for a core dip
(9) Cores could be used to make castings 15 minutes after mixing.

It will be appreciated that although hexylene glycol was used successfully in this example, its use may present difficulties if the $BF_3$ complex is mixed with it and stored for a period of time.

EXAMPLE II

The procedures of Example I were substantially repeated wherein the $BF_3$-dihydrate was added as a 20% solution in polypropylene glycol (MW=425). Improved results were obtained. It is relative to note that even on standing the $BF_3$-dihydrate solution in this case gives more desirable results.

EXAMPLE III

The procedures of Example I were substantially repeated wherein equivalent amounts of the following $BF_3$ catalysts were employed: $BF_3$ etherate, $BF_3$ diethyl ether complex, $BF_3$ phenol, $BF_3$ butyl alcohol, $BF_3$ ethylene, glycol monoethyl ether, $BF_3$ diethylene glycol monobutyl ether, $BF_3$ propylene glycol (MW=400). In each instance, similar results were obtained.

EXAMPLE IV

The procedure of Example I was essentially repeated wherein the polyepoxide was 3,4-epoxy-6-methylcyclohexylmethyl-3,4-epoxy-6-methyl - cyclohexanecarboxylate. Similar cured products were obtained.

EXAMPLE V

The procedure of Example I was substantially followed except that a blend of 25% by weight of Polyether A and 25% by weight of a condensation product of epichlorohydrin and glycerine having an average molecular weight of about 300, an epoxide functionality of about 2.2 and containing approximately 10% by weight of tightly bound chlorine (Polyether X) was used. A smooth strong core resulted having good qualities and surfaces.

EXAMPLE VI

This example shows that polypropylene glycol can be used as a viscosity reducer for the epoxide.

The procedure of Example I was substantially repeated wherein a blend of 90 parts by weight of Polyether A and 10 parts by weight of polypropylene glycol having an average molecular weight of 150 was used to reduce the viscosity. Related results are obtained.

If the sand-polyepoxide blend is to be stored for an extended length of time before mixing with the $BF_3$ complex, it is usually desirable to add the polypropylene glycol, or other additive to reduce the viscosity, as a $BF_3$-complex solution.

EXAMPLE VII

This example shows that the sand, epoxide and curing agent can successfully be blended simultaneously.

Sand at 75° F. was fed to two parallel auger mixers at the rate of 150 pounds per minute to each mixer. Resin (Polyether A) was fed to one of the screws at a rate of three pounds per minute and the curing agent ($BF_3$ dihydrate/polypropylene glycol 425 in 1:3 weight ratio) were fed to the second auger mixer at a rate of 0.75 pound per minute. The two sand blends were then fed into a third auger mixer to mix the two streams together. The final stream was fed into core boxes to form sand cores for foundry castings. The cores were removed from the core boxes in five minutes and excellent iron castings were made from them ten minutes later.

EXAMPLE VIII

A curing agent was made from a complex of boron trifluoride phenol complex (26% $BF_3$) by blending 20% of the complex with 80% wt. of polypropylene glycol (MW=450).

Two grams of this solution were mixed with 300 grams of AFS50 sand containing 6 grams of Polyether A. The resulting sand composition was packed into a vacuum formed polystyrene mold within three minutes—the useable life of the blend. The sample was hard in five minutes and was removed from the mold. The part was easily removed, showed excellent fidelity and had a tensile strength of over 200 p.s.i.

EXAMPLE IX

The procedures of Example I were essentially repeated except that Polyether A was diluted with 15% of furfuryl alcohol to reduce the viscosity of the resin. The same curing agents, blend and amounts were used. The sand packed into the mold very easily but the cure time and final core properties were essentially unchanged.

EXAMPLE X

This example illustrates an especially preferred embodiment wherein a special blend of epoxides and a special blend of oxygenated hydrocarbons are utilized.

An automatic metering mining machine (Carver Continuous flow muller) was fed with three hundred pounds per minute of foundry sand AFS50 grade. Simultaneously a blend of 92% w. of a liquid glycidyl polyether of bisphenol A of molecular weight of about 380 and an epoxide equivalent weight about 185 and 8% w. of Cardura* E resin along with a curing agent consisting of 20% w. solution of $BF_3 \cdot 2H_2O$ in a 1/1 blend of polypropylene glycol 425 and polypropylene glycol 150 were fed at rates of three and 0.6 pounds per minute, respectively. The residence time in the mixer was about 35 seconds. The sand was packed into a core box, utilizing a vibrator for ---
*Registered Trademark U.S. Patent Office.

compaction within two minutes, struck off, and stripped four minutes after dispensing the sand from the machine. There was no objectionable odor evolved and the core was used in 15 minutes to prepare a high quality gray iron casting.

EXAMPLE XI

Ottawa 17 sand, a standard foundry silica sand, was used with varying amounts of the resin and curing agent mixture of Example X at a 5 to 1 ratio. The same method of preparing the foundry cores as in Example X and tensile strength of the cores was tested using a dogbone mold with a one square inch cross section on an Instron tester. A tensile strength of about 100 pounds per square inch (p.s.i.) is usually considered necessary for a usable foundry core. It can be seen from the following table that only 1% w. or less of the binder-curing agent combination is needed to attain a tensile strength of 100 p.s.i. after a 30 minute curing period at room temperature. Further, although high tensile core are obtained using more than 2% w. of the binder and curing agent, it is unnecessary to use that much since there is no real improvement. Normally at least 2–3% w. of a phenolic binder is required to reach this level and the mold must be heated.

TABLE 1

| Binder and curing agent, percent weight | Sand, percent | P.s.i. |
| --- | --- | --- |
| 0.5 | 99.5 | 42 |
| 1.0 | 99.0 | 180 |
| 1.5 | 98.5 | 350 |
| 2.0 | 98.0 | 450 |
| 2.5 | 97.5 | 450 |
| 3.0 | 97.0 | 450 |

EXAMPLE XII

This example illustrates the inferiority of the use of $BF_3$ amine complexes as curing agents.

If attempts are made to duplicate the process and results of Example XI using the same epoxide blend as well as the same polyol blend, but using $BF_3$ methyl-ethylamine complex, a usable foundry core is not obtained within a 30 minute period or within several hours. A usable foundry was prepared by mixing 100 parts of a liquid glycidyl polyether of Example XI with 3 parts of $BF_3$·methyl-ethylamine and heating to 120° C. to effect solution. This was cooled to room temperature and 2 parts of this solution were then mixed with 100 parts sand. The mixture was packed into a core box, but did not cure at ambient temperatures. If the core box was heated to 100° C. for about 1 hour, a useable foundry core was formed.

EXAMPLE XIII

It is believed that the use of the corresponding boron trichloride dihydrate in the process illustrated by Example X results in a good quality foundry core.

While the above discussion and examples describe the use of particularly effective, and therefore preferred, boron trifluoride complexes as curing agents, it should be noted that certain halides of the metals of Group III and IV (tin, aluminum, etc.) of the periodic table and complexes thereof may provide useful curing agents in polyepoxide systems similar to those described. Although these halides are often more expensive they exhibit certain favorable properties, such as low toxicity and low corrosiveness, which may make them applicable in special situations. For example, a foundry core which was curable at ambient temperatures was prepared by mixing 98 parts by weight (p.b.w.) of silica sand, 2 p.b.w. polyether A and 0.7 p.b.w. of 20% wt. of stannous chloride (anhydrous) in ethylene glycol monobutyl ether.

I claim as my invention:

1. A process for preparing foundry cores which comprises
   (a) blending from about 80 to 99 parts by weight of sand with 1 to 20 parts by weight of a resin binder consisting essentially of a polyepoxide containing at least one vic-epoxy group,
   (b) mixing said blend from (a) with from about 1 to 20 parts per 100 parts by weight of the polyepoxide of a solution consisting essentially of 5–50 percent by weight of boron trifluoride dihydrate, in a liquid aliphatic polyol diluent,
   (c) packing the mix of (b) in suitable molds, and
   (d) allowing the mixture to cure at ambient temperature.

2. The process of claim 1 wherein 95 to 99 parts by weight of inert particles are blended with 1 to 5 parts by weight of the polyepoxide and 1.0 to 20 parts per 100 parts by weight of the polyepoxide of boron trifluoride dihydrate.

3. The process of claim 1 wherein the polyepoxide is a liquid glycidyl polyether of 2,2-bis(4-hydroxyphenyl)propane.

4. The process of claim 1 wherein the polyepoxide is a mixture of 80–98 parts by weight of a liquid glycidyl polyether of 2,2-bis(hydroxyphenyl)propane and 2–20 parts by weight of a glycidyl ester of alpha-branched saturated monocarboxylic acids of from 2–20 carbon atoms.

5. The process of claim 1 wherein the aliphatic polyol is a polyalkylene glycol.

6. A process for consolidating inert particles which comprises
   (a) simultaneously blending from about 80 to 99 parts by weight of sand with 1 to 20 parts by weight of a resin binder consisting essentially of a polyepoxide containing at least one vic-epoxy group and 0.5 to 40.0 parts per 100 parts by weight of the polyepoxide of a solution consisting essentially of boron trifluoride dihydrate in an aliphatic polyol,
   (b) packing the blend of (a) in suitable molds, and
   (c) allowing the blend to cure at ambient temperature.

7. The process of claim 6 wherein the polyepoxide is a mixture of 80–98 parts by weight of a liquid glycidyl polyether of 2,2-bis(4-hydroxyphenyl)propane with an average molecular weight of about 340–380 and an epoxy equivalent weight of about 185–192 ond 2–20 parts by weight of a glycidyl ester of alpha-branched, saturated monocarboxylic acid of from 2–20 carbon atoms.

8. A process for the preparation of foundry cores which comprises
   (a) blending from about 95 to 99 parts by weight of sand with 1 to 5 parts by weight of a mixture consisting essentially of (1) 80–98 parts by weight of a liquid glycidyl polyether of 2,2-bis(4-hydroxyphenyl)-propane of an average molecular weight of about 380 and an epoxy equivalent weight of about 185 and (2) 2–20 parts by weight of a glycidyl ester of alpha-branched, saturated monocarboxylic acid of from 9–11 carbon atoms,
   (b) mixing the blend of (a) with from about 1 to 20 parts per 100 parts by weight of the polyepoxide of a solution consisting essentially of 5–50% by weight boron trifluoride dihydrate in a mixture of 25–75 parts by weight polypropylene glycol 150 and 25–75 polypropylene glycol 425,
   (c) packing the blend of (a) in suitable molds, and
   (d) allowing the mixture to cure at ambient temperature.

References Cited

UNITED STATES PATENTS

| | | | |
| --- | --- | --- | --- |
| 2,824,083 | 2/1958 | Parry et al. | 260—33.4 EP X |
| 3,268,466 | 8/1966 | Simm | 260—37 EP X |
| 3,107,403 | 10/1963 | Moore | 260—37 EP X |
| 3,004,952 | 10/1961 | Brueschweiler | 260—47 EN |
| 2,633,458 | 3/1953 | Shokal | 260—47 EC |

LEWIS T. JACOBS, Primary Examiner

U.S. Cl. X.R.

260—DIG 40